(12) United States Patent
Alberti et al.

(10) Patent No.: US 8,099,767 B2
(45) Date of Patent: Jan. 17, 2012

(54) SECURE AGENT-LESS ENTERPRISE INFRASTRUCTURE DISCOVERY

(75) Inventors: Enrica Alberti, Rome (IT); Luigi Pichetti, Rome (IT); Marco Secchi, Rome (IT); Antonio Secomandi, Brugherio (IT)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 12/166,252

(22) Filed: Jul. 1, 2008

(65) Prior Publication Data

US 2010/0005516 A1    Jan. 7, 2010

(51) Int. Cl.
*H04L 9/32* (2006.01)
*H04L 9/00* (2006.01)
*G06F 7/04* (2006.01)

(52) U.S. Cl. ............. 726/6; 726/3; 726/4; 726/5; 726/7; 726/8; 713/168; 713/169; 713/182; 713/183; 713/184

(58) Field of Classification Search ........................ 726/6
See application file for complete search history.

(56) References Cited

U.S. PATENT DOCUMENTS

| 6,144,959 | A | 11/2000 | Anderson et al. |
| 6,438,600 | B1 | 8/2002 | Greenfield et al. |
| 2003/0131096 | A1 | 7/2003 | Goringe et al. |
| 2005/0038889 | A1 | 2/2005 | Frietsch |
| 2005/0210096 | A1 | 9/2005 | Bishop et al. |
| 2007/0180503 | A1* | 8/2007 | Li et al. ............................. 726/5 |
| 2008/0320588 | A1* | 12/2008 | Lipetz ............................. 726/19 |

* cited by examiner

*Primary Examiner* — Longbit Chai
(74) *Attorney, Agent, or Firm* — Stephen J. Walder, Jr.; Jeffrey S. LaBaw

(57) ABSTRACT

Mechanisms for securing dynamic discovery of an enterprise computing infrastructure is provided. One implementation involves maintaining enterprise credential information in a secured trust store, receiving an access request through a secure connection for access to a remote infrastructure component, determining the type of the access request, for a root-level type access request, responding to the request via the secure connection with enterprise root credentials from the trust store, and for an unprivileged type access request, responding to the request via the secure connection with unprivileged access enterprise credentials from the trust store.

13 Claims, 3 Drawing Sheets

SECURE AGENT-LESS ENTERPRISE INFRASTRUCTURE DISCOVERY

BACKGROUND OF THE INVENTION

1. Field of the Invention

The present invention relates generally to enterprise infrastructure discovery and in particular to secure enterprise infrastructure discovery.

2. Background Information

Automated discovery of enterprise computing infrastructure poses major concerns in terms of scalability and security. In this context the phrase "enterprise infrastructure discovery" is used to identify discovering not only the infrastructure topology (what server is running where), but also the type and configuration of applications that are running on those servers. A server may include back-end server computers or any network-connected device.

In order to be effective, an enterprise infrastructure discovery must not rely on an agent on the server that is the target of the discovery. Agent-less discovery does not require network topology knowledge in advance, and is useful with those systems where an agent is not deployed.

Once a new server has been added to the list of machines to be discovered in a system, the discovery process must gain access to the system and perform application configuration retrieval. Such application configuration retrieval requires the discovery process to rely on application specific users accounts.

Agent-less discovery requires remote system user credentials. A centralized discovery process requires remote system user credentials, wherein the manner of collecting, storing and managing such credentials poses severe concerns in terms of security and usability. In addition, if the enterprise is properly managed, the passwords expire over a period of time, therefore requiring a tremendous overhead in credentials management. An example of an enterprise infrastructure discovery product is the IBM Tivoli Application Dependency Discovery Manager (TADDM) product. TADDM performs Application configuration discovery in the enterprise for DB2, Oracle BeaLogic and other middleware. In order to perform this task, the TADDM requires valid credentials (username and password) for each machine and for each instance of Middleware installed on it; such credentials are stored inside the discovery product itself. This approach to credentials management may pose concerns, depending on security policies of the target enterprise environment.

SUMMARY OF THE INVENTION

The invention provides a method and system for securing dynamic discovery of an enterprise computing infrastructure. One embodiment involves maintaining enterprise credential information in a secured trust store, receiving an access request through a secure connection for access to a remote infrastructure component, determining the type of the access request, for a root-level type access request, responding to the request via the secure connection with enterprise root credentials from the trust store, and for an unprivileged type access request, responding to the request via the secure connection with unprivileged access enterprise credentials from the trust store.

For an unprivileged type access request, if the requested unprivileged access is for query-only access, credentials are created and the request responded to via the secure connection with the created credentials.

An agent-less discovery engine may request and use the credentials to access the remote infrastructure component. Access credentials maybe renewed based on policies, before credential expiration.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention provides a method and system for secure agent-less enterprise infrastructure discovery. One embodiment involves a credential management system implementing a credential management process, wherein the credentials of needed user accounts are managed, wherein new accounts that serve specific purposes are created as needed without manual intervention.

Figure 1:
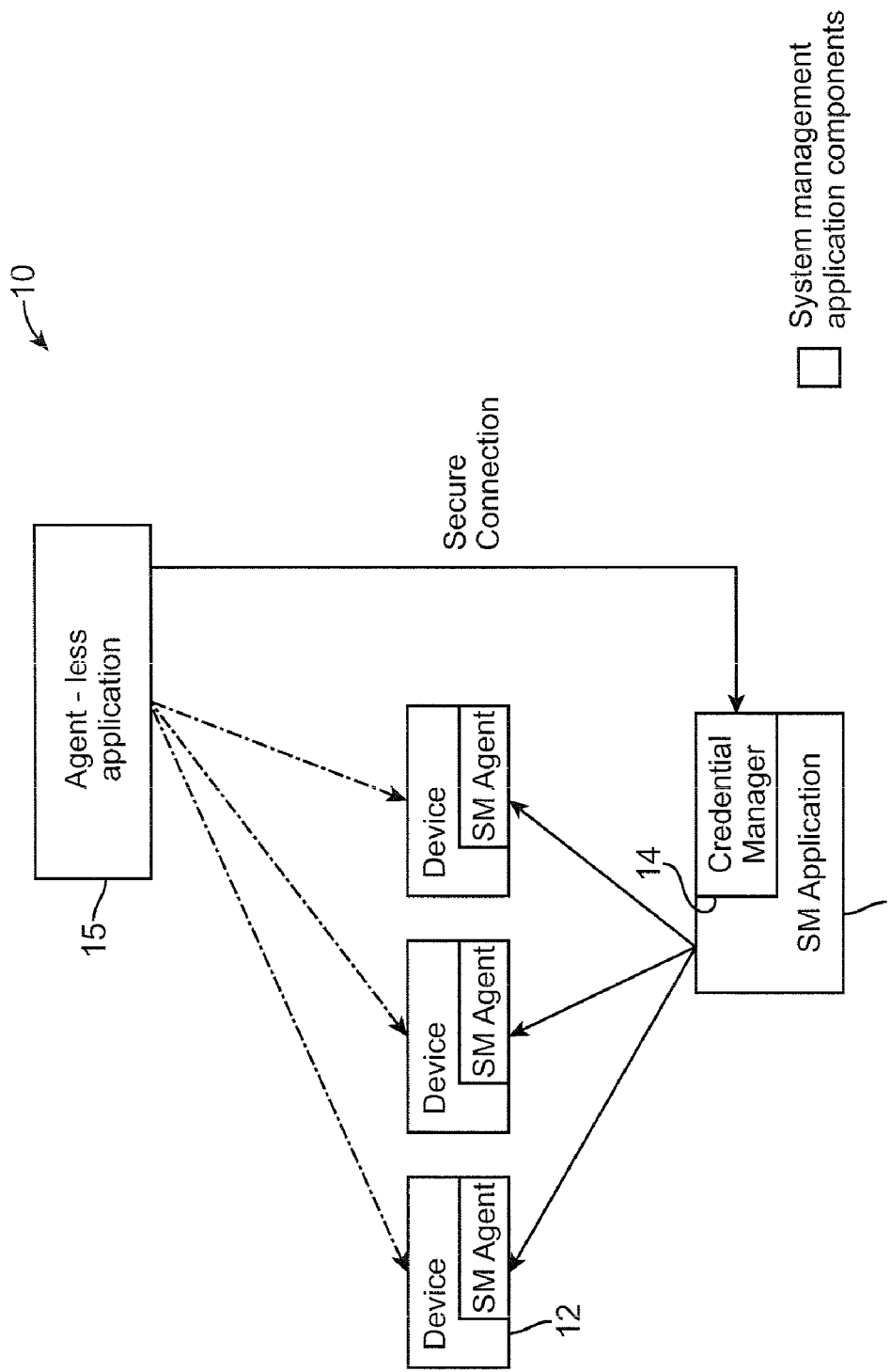
FIG. 1 shows a functional block diagram of architecture of a system for securing agent-less dynamic discovery of an enterprise computing infrastructure, according to an embodiment of the invention.

FIG. 1 shows an example architecture 10 implementing an embodiment of the invention. The architecture 10 includes a system management (SM) application 11 implementing a credential management system that manages credentials and device accounts for devices 12, 13.

Figure 2:
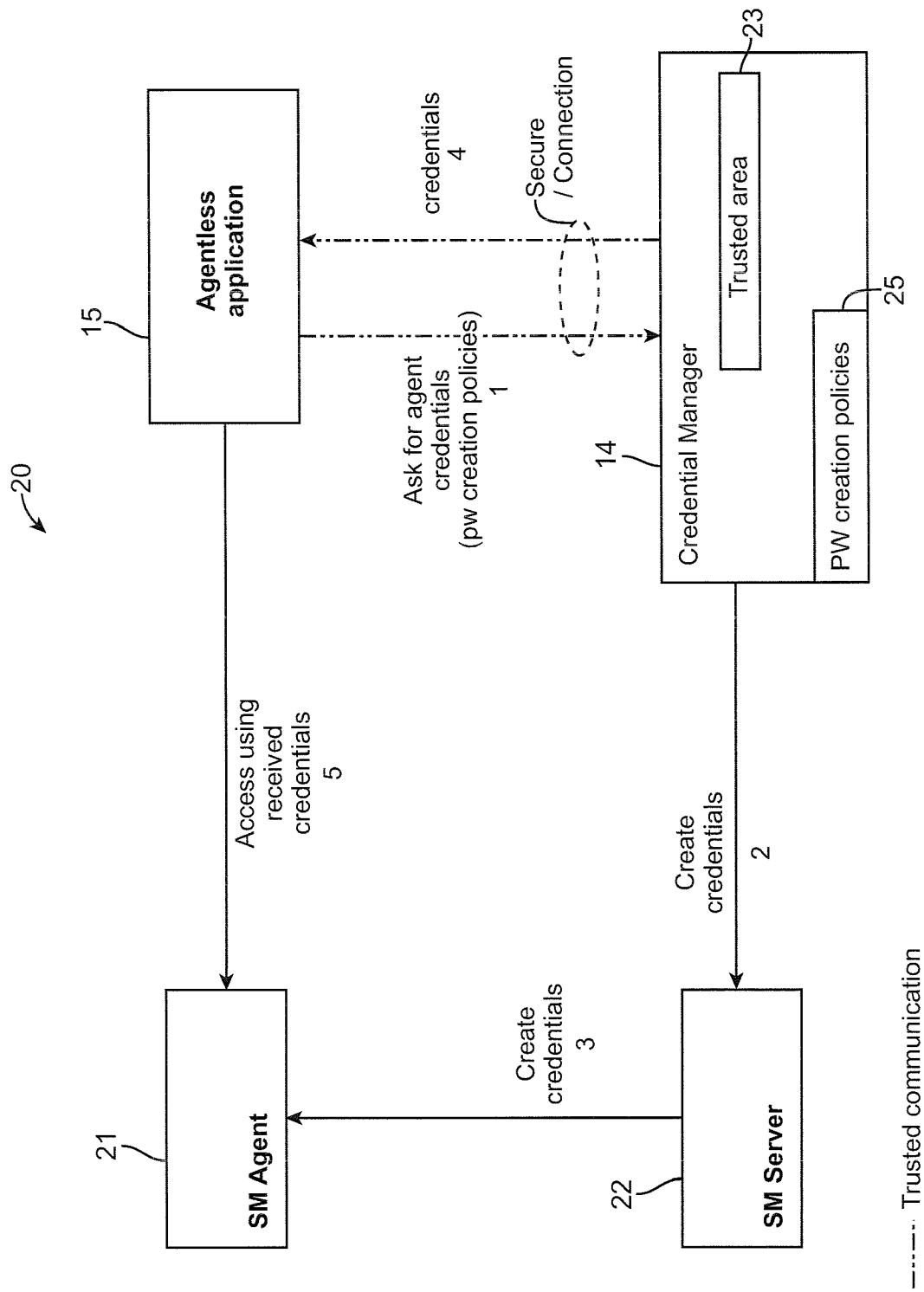
FIG. 2 shows a functional flow diagram of a system for securing agent-less dynamic discovery of an enterprise computing infrastructure, according to an embodiment of the invention.

Now also referring to the example architecture 20 in FIG. 2, an agent-less management application 15 (Agent-less System Management Application) may leverage the credential manager 14 to manage credentials and device accounts needed. The SM application 11 includes a credential manager 14 that leverages a System Management Device Service (SM Agent 21/SM Server 22) to perform device account operations (e.g., account creation, deletion, activation, deactivation, password update) on target devices 12.

The credential manager 14 maintains enterprise credential information in a secured trust store 23.

FIG. 2 also shows a sequence of steps of an operation scenario. In step 1, the agent-less management application 15 (e.g., configuration discovery) interfaces the credential manager 14 to obtain target device account credentials. If the requested account does not exist (or if it requires revalidation), then in steps 2 and 3 the credential manager 14 creates such an account using SM server 22 and SM agent 21. In step 4, the credential manager 14 provides the credentials (exiting or newly created) to the agent-less management application 15. In step 5, the agent-less management application 15 uses the credentials to access the target device to perform a requested function.

The agent-less management application 15 does not require the actual credential of an existing user on the target device because the agent-less management application 15 use credentials created "on the fly" by the credential manager 14 (steps 2-4) or credentials already created and maintained in the trusted store 23 if matching the password creation policies 25. The only needed information is the characteristic of the account to perform the requested function. Placing the password (PW) creation policies in the credential allows decoupling such PW policies, usually common to the entire enterprise, from the specific agent-less application, whereby other authorized application can exploit the PW creation policies. Credential manager, when updating credentials, does not need to interact with the agent-less application.

The credential manager 14 is also responsible for credential (e.g., password) renewing process. Based on policies, before password expiration, the credential manager 14 modifies the passwords on the target machines 12, 13 and in the secure store 23, screening the agent-less application 15 from such a task.

The invention allows maintaining the benefits and technical characteristics of agent-less and dynamic discovery (driven by relationship among middleware and application stacks), while better addressing security policies (i.e., the need to embed and maintain security credentials associated to all the systems and middleware to be potentially explored). This is achieved by separating the storage/maintenance of security credentials from the discovery engine, to an external subsystem which is dedicated to storing, updating (according to password robustness and expiration policies) and eventually creating ad-hoc credentials (in case unprivileged credentials are to be used for query-only access for agent-less discovery).

As such, an agent-less discovery application 15 such as Agent-less Discovery Engine (ADE) need not keep any credentials about remote operating systems middleware to inspect. The ADE is paired (e.g., via a secure connection guarded via certificates) with the credential manager (CM) 14 and exchanges credentials information therewith, which can hence be encrypted.

During a discovery process, when the ADE determines that it needs to remotely access an OS or a middleware stack, as noted two scenarios are possible, depending on the system configuration:

1—The ADE can request the CM for root-level access (CM will pass root credentials for the device).
2—The ADE can request the CM for unprivileged access (CM will pass such unprivileged credentials, or will create them on the fly, on the specific device/middleware, if not available).

In this way the CM shields the ADE from credential management (i.e., availability, creation, update, etc.), and allows the ADE to perform a dynamic agent-less discovery.

An example involves secure dynamic discovery of enterprise infrastructure, wherein an agent-less discovery engine needs to access a remote infrastructure component (e.g., operating system or middleware stack). The agent-less discovery engine requests the external credential manager through a secure connection for access to a remote infrastructure component. If root-level access was requested by the agent-less discovery engine, the external credential manager sends back the root credential through the secure connection. If unprivileged access was requested by the agent-less discovery engine, the external credential manager sends back the unprivileged access credentials through the secure connection (the external credential manager creates the credentials if the requested unprivileged access is indicated as being for query-only access).

In an environment where in the same enterprise there is a mix of "agent-less" and "agent-full" targets, the enterprise infrastructure discovery continues to perform agent-less discovery, but can take advantage of existing agents for credentials management.

Figure 3:
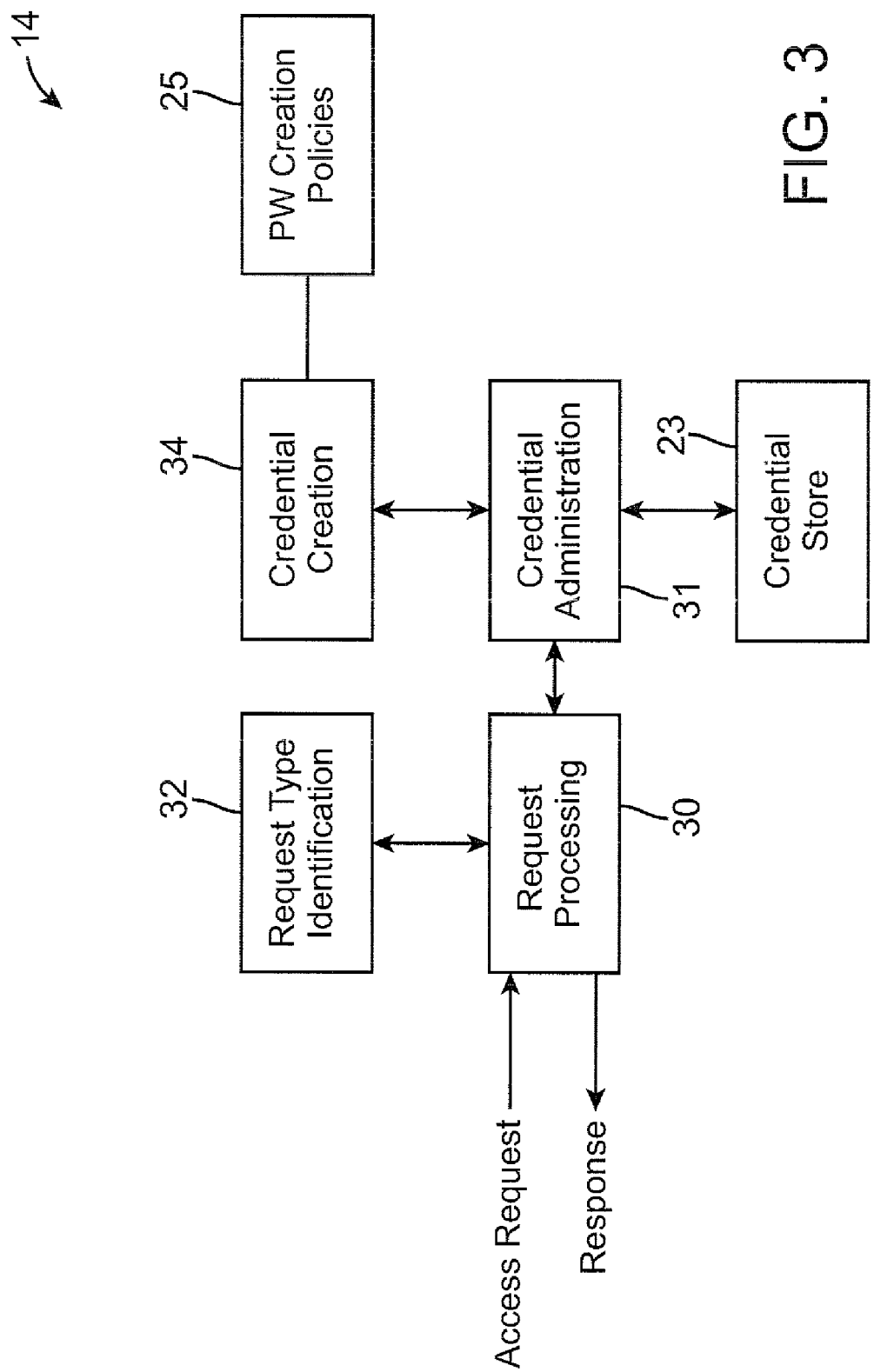
FIG. 3 shows a functional block diagram of a credential manager for securing agent-less dynamic discovery of an enterprise computing infrastructure, according to an embodiment of the invention.

FIG. 3 shows a functional block diagram of the CM 14 according to an embodiment of the invention. The CM 14 includes a request processing module 30, a credential administrator 31, a request type identification module 32, and a credential creation module 34. The trusted store 23 may be part of the CM 14 or may be stored elsewhere. The CM 14 is configured for securing dynamic discovery of an enterprise computing infrastructure.

In one example, the credential administrator 31 maintains enterprise credential information in the secured trust store 23. The request processing module 30 receives an access request through a secure connection for access to a remote infrastructure component, and invokes the request type identification module 32 to determine the type of access request. For a root-level type access request, the request processing module 30 utilizes the credential administrator 31 to retrieve enterprise root credentials from the trust store, and responds to the request via the secure connection with the retrieved enterprise root credentials. For an unprivileged type access request, the request processing module 30 utilizes the credential administrator 31 to retrieve unprivileged access enterprise credentials from the trust store, and responds to the request via the secure connection with the retrieved unprivileged access enterprise credentials from the trust store. For an unprivileged type access request, if the requested unprivileged access is for query-only access, the request processing module 30 utilizes the credential administrator 31 to invoke the credential creation module 34 for creating credentials for the access, and responds to the request via the secure connection with the created credentials.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method, in an agent-less discovery engine of a data processing system, for securing dynamic discovery of an enterprise computing infrastructure, comprising:
   maintaining enterprise credential information in a secured trust store;
   receiving an access request through a secure connection for access to a remote infrastructure component;
   automatically determining the type of the access request;
   for a root-level type access request, automatically responding to the request via the secure connection with enterprise root credentials from the trust store;
   for an unprivileged type access request, automatically responding to the request via the secure connection with unprivileged access enterprise credentials from the trust store; and
   automatically utilizing, by the agent-less discovery engine, the remotely received enterprise root credential or the remotely received unprivileged access enterprise credentials, depending on the determined type of the access request, to access the remote infrastructure component of the enterprise computing infrastructure to perform application configuration retrieval from the remote infrastructure component as part of the discovery of the enterprise computing infrastructure, wherein the secure trust store is maintained separate from the agent-less discovery engine.

2. The method of claim 1, further comprising:
   for an unprivileged type access request, creating credentials if the requested unprivileged access is for query-only access, and responding to the request via the secure connection with the created credentials.

3. The method of claim 1, wherein:
   maintaining enterprise credential information further comprises:
   an external credential manager maintaining enterprise credential information in the secured trust store;
   receiving an access request through a secure connection further comprises: the external credential manager receiving an access request through a secure connection for access to the remote infrastructure component; and
   responding to the request comprises: the external credential manager responding to the request via the secure connection.

4. The method of claim 3 further including: the credential manager renewing access credentials based on policies, before credential expiration.

5. An apparatus for securing dynamic discovery of an enterprise computing infrastructure, comprising:
   a credential administrator configured for maintaining enterprise credential information in a secured trust store;
   a request processing module configured for receiving an access request through a secure connection for access to a remote infrastructure component;
   a request type identification module configured for automatically determining the type of the access request, the request processing module further configured such that:
      for a root-level type access request, the request processing module automatically responds to the request via the secure connection with enterprise root credentials from the trust store; and
      for an unprivileged type access request, the request processing module automatically responds to the request via the secure connection with unprivileged access enterprise credentials from the trust store; and
   an agent-less discovery engine configured to automatically utilize either the remotely received enterprise root credential or the remotely received unprivileged access enterprise credentials, depending on the determined type of the access request, to access the remote infrastructure component of the enterprise computing infrastructure to perform application configuration retrieval from the remote infrastructure component as part of the discovery of the enterprise computing infrastructure, wherein the secure trust store is maintained separate from the agent-less discovery engine.

6. The apparatus of claim 5 further comprising a credential creation module configured for creating credentials, wherein for an unprivileged type access request, credential creation module creates credentials if the requested unprivileged access is for query-only access, and the request processing module responds to the request via the secure connection with the created credentials.

7. The apparatus of claim 6, wherein the credential administrator is further configured for renewing access credentials based on policies, before credential expiration.

8. A system for dynamic discovery of an enterprise computing infrastructure, comprising:
   an agent-less discovery engine configured for performing dynamic agent-less discovery, for access to a remote infrastructure component;
   a credential manager configured for securing dynamic discovery of the enterprise computing infrastructure, the credential manager comprising:
      a credential administrator configured for maintaining enterprise credential information in a secured trust store;
      a request processing module configured for receiving an access request from the agent-less discovery engine through a secure connection for access to a remote infrastructure component; and
      a request type identification module configured for automatically determining the type of the access request;
      the request processing module further configured such that:
         for a root-level type access request, the request processing module automatically responds to the request via the secure connection with enterprise root credentials from the trust store; and
         for an unprivileged type access request, the request processing module automatically responds to the request via the secure connection with unprivileged access enterprise credentials from the trust store,
   wherein the agent-less discovery engine configured to automatically utilize either the remotely received enterprise root credential or the remotely received unprivileged access enterprise credentials, depending on the determined type of the access request, to access the remote infrastructure component to perform application configuration retrieval from the remote infrastructure component as part of the discovery of the enterprise computing infrastructure, and wherein the secure trust store is maintained separate from the agent-less discovery engine.

9. The system of claim 8 further comprising a credential creation module configured for creating credentials, wherein for an unprivileged type access request, credential creation module creates credentials if the requested unprivileged access is for query-only access, and the request processing module responds to the request via the secure connection with the created credentials.

10. The system of claim 9, wherein the credential administrator is further configured for renewing access credentials based on policies, before credential expiration.

11. The system of claim 8 further including agent-full components.

12. The system of claim 8, wherein the credential manager is further configured for shielding the agent-less discovery engine from credential management and allowing the agent-less discovery engine to perform a dynamic agent-less discovery of the enterprise infrastructure.

13. The system of claim 8, wherein the credential manager is an external credential manager.

* * * * *